United States Patent
Hamaguchi et al.

(10) Patent No.: US 8,623,464 B2
(45) Date of Patent: Jan. 7, 2014

(54) PROCESS FOR PRODUCTION OF WATER-ABSORBING ARTICLES

(75) Inventors: Shigeo Hamaguchi, Matsusaka (JP); Yukihiro Ougitani, Matsusaka (JP); Yoshinori Akamatsu, Matsusaka (JP); Shinobu Arata, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 573 days.

(21) Appl. No.: 12/867,851

(22) PCT Filed: Feb. 24, 2009

(86) PCT No.: PCT/JP2009/053279
§ 371 (c)(1),
(2), (4) Date: Aug. 16, 2010

(87) PCT Pub. No.: WO2009/119226
PCT Pub. Date: Oct. 1, 2009

(65) Prior Publication Data
US 2010/0310779 A1    Dec. 9, 2010

(30) Foreign Application Priority Data

Mar. 27, 2008 (JP) .................. 2008-083184
Mar. 27, 2008 (JP) .................. 2008-083186

(51) Int. Cl.
*B05D 1/02* (2006.01)
(52) U.S. Cl.
USPC .......... 427/424; 427/421.1; 428/63; 428/912; 220/900; 220/902; 220/560.02
(58) Field of Classification Search
USPC .......... 427/424, 421.1; 428/63, 912; 220/900, 220/902, 560.02
See application file for complete search history.

(56) References Cited

U.S. PATENT DOCUMENTS

| | | | | |
|---|---|---|---|---|
| 3,698,587 A | * | 10/1972 | Baker et al. ............... | 428/63 |
| 4,767,671 A | | 8/1988 | Parker et al. | |
| 5,942,035 A | | 8/1999 | Hasebe et al. | |
| 2003/0017275 A1 | * | 1/2003 | Schick et al. ............ | 427/421 |

(Continued)

FOREIGN PATENT DOCUMENTS

JP    63-500590 A    3/1988
JP    2-74540 A    3/1990

(Continued)

OTHER PUBLICATIONS

International Search Report including English translation dated Jun. 9, 2009 and PCT/ISA/237 Form (Nine (9) pages).

*Primary Examiner* — Timothy Meeks
*Assistant Examiner* — Nathan T Leong
(74) *Attorney, Agent, or Firm* — Crowell & Moring LLP (57) ABSTRACT

According to a first aspect of the present invention, a process for production of a water-absorbing article including a substrate and a coating film formed on the substrate and formed of a water-absorbing urethane resin is characterized in that: the process comprises an application step of applying a coating liquid to the substrate; the application step includes a step of supplying the coating liquid from a nozzle disposed above the substrate to a surface of the substrate conveyed horizontally; the coating liquid includes a solid matter and a solvent; the solid matter includes a mixture of a polyisocyanate, a polyol having ethylene oxide and a hydrophobic polyol; a concentration of the solid matter in the coating liquid is adjusted within a range from 5 to 30% in mass; and a viscosity of the coating liquid is adjusted within a range from 1 to 3 mPa·s.

8 Claims, 2 Drawing Sheets

(56) References Cited

U.S. PATENT DOCUMENTS

2006/0178071 A1* 8/2006 Schmidt et al. ............... 442/417
2009/0118428 A1   5/2009 Ougitani et al.

FOREIGN PATENT DOCUMENTS

| JP | 7-320999 A    | 12/1995 |
| JP | 2001-137760 A | 5/2001  |
| JP | 2001-137761 A | 5/2001  |
| JP | 2001-191001 A | 7/2001  |
| JP | 2004-57942 A  | 2/2004  |
| JP | 2004-73969 A  | 3/2004  |
| JP | 2004-122705 A | 4/2004  |
| JP | 2005-187276 A | 7/2005  |
| JP | 2007-76999 A  | 3/2007  |
| JP | 2007-196164 A | 8/2007  |

* cited by examiner

PROCESS FOR PRODUCTION OF WATER-ABSORBING ARTICLES

TECHNICAL FIELD

The present invention relates to a production process of a water-absorbing article including a coating having urethane resin, which is obtained by applying a coating liquid to a substrate (base member), more particularly, relates to a process for efficiently producing such articles.

BACKGROUND OF THE INVENTION

A water-absorbing article has been proposed which is obtainable by forming a functional coating including an urethane resin having water-absorbing property, on a substrate (for example, Patent Documents 1 and 2). In this technique, the water-absorbing article is produced by applying a coating liquid (application liquid) to the substrate and by conducting a drying step and the like. The water-absorbing article proposed in the Patent Document 1 suppresses a fogging of the article by virtue of a water-absorbing property of the coating so that a transparency (visibility) of the article is ensured, even under an environment causing the fogging in an article having no such coating.

Previously, as a liquid-application method for a flat-plate-shaped substrate, a method has been proposed in which the coating liquid is applied on the substrate by supplying the coating liquid from a nozzle. Patent Documents 3 and 4 disclose a method in which a high-viscosity coating liquid is supplied and applied to a horizontally-conveyed substrate, from opening portions of two or more nozzles array. In this case, the high-viscosity application liquid has a viscosity value ranging from 1 to 1000 Pa·s. Moreover, Patent Document 5 discloses a coating-film producing process in which a coating liquid (application liquid) is supplied to a rotating disc-shaped substrate from a plurality of nozzles, so as to apply a uniform quantity of coating liquid per unit area of the substrate, and then, the liquid applied on the substrate is flattened by means of its leveling action.

Patent Document 1: Japanese Patent Application Publication No. 63-500590
Patent Document 2: Japanese Patent Application Publication No. 2007-76999
Patent Document 3: Japanese Patent Application Publication No. 2001-137760
Patent Document 4: Japanese Patent Application Publication No. 2001-137761
Patent Document 5: Japanese Patent Application Publication No. 2004-73969

SUMMARY OF THE INVENTION

The process which includes the step of supplying coating liquid to the substrate from a plurality of nozzles and hence which is suitable for applying the coating liquid uniformly in quantity per unit area of the substrate is attractive from a view point of high-volume production of water-absorbing articles. However, in the case that a water-absorbing article is obtained by employing this process, there are various issues that should be considered.

In the case that this process is employed, it is preferable that a location of each nozzle is fixed and the substrate is conveyed in a horizontal direction from the view point of high-volume production of water-absorbing articles. Because the coating liquid (application liquid) is supplied from the plurality of nozzles, after the discharge of coating liquid, the coating liquids (some pieces of coating liquid) discharged on the substrate influence each other. This makes it difficult to obtain a flat coating, as a result. Moreover, in a case that a mechanical manipulation is additionally provided in order to flatten the coating liquid applied to the substrate before a solvent included in the coating liquid applied on the substrate is dried, an apparatus for applying the coating liquid is complicated to increase a production cost.

When trying to attain various functions by use of the water-absorbing property of the coating film, because these functions are influenced also by an absolute amount of water absorption in the coating film, a setting of thickness of the coating film is important in addition to a setting of water absorption rate (percentage) of the coating film in consideration of a commercial value of article. For example, in order to suppress the fogging of article and thereby to secure the transparency of article, the coating film needs to have a relatively-large film thickness approximately ranging from 5 to 100 μm when the water absorption percentage of coating film is set at 10~40% in mass.

From the view point of high-volume production, it is preferable that the coating liquid is put on the substrate only one time (one-time application). In order to obtain a thick coating by one-time application of liquid, it is necessary to increase a concentration of solid matter included in the coating liquid. However, in the case that the solid-matter concentration included in coating liquid is made high, the viscosity of coating liquid is also increased. Thereby, it becomes difficult to cause the coating liquid to coat and spread when the coating liquid is applied to the substrate. Thus, in this case, for example, a technical problem is caused that a coating film having its flat surface becomes difficult to obtain.

It is an object of the present invention to solve the above technical problem. That is, the present invention relates to a production process for a water-absorbing article which includes a step of applying the coating liquid, and the object of the present invention is to provide a production process devised to ensure a quality of article while attaining the high-volume production of the article.

According to a first aspect of the present invention, a process for production of a water-absorbing article including a substrate and a coating film formed on the substrate and formed of a water-absorbing urethane resin is characterized in that: the process comprises an application step of applying a coating liquid to the substrate, the application step including a step of supplying the coating liquid from a nozzle to a surface of the substrate, the nozzle being disposed above the substrate conveyed horizontally; the coating liquid includes a solid matter and a solvent, the solid matter including a mixture of a polyisocyanate, a polyol having ethylene oxide and a hydrophobic polyol; a concentration of the solid matter in the coating liquid is adjusted within a range from 5 to 30% in mass; and a viscosity of the coating liquid is adjusted within a range from 1 to 3 mPa·s.

According to a second aspect of the present invention, a process for production of a water-absorbing article including a substrate and a coating film formed on the substrate and formed of a water-absorbing urethane resin is characterized in that: the process comprises an application step of applying a coating liquid to the substrate, the application step including a step of supplying the coating liquid from a plurality of nozzles to a surface of the substrate, the plurality of nozzles being disposed above the substrate conveyed horizontally and being arranged in a direction that perpendicularly crosses the substrate relative to a conveying direction of the substrate; the coating liquid includes a solid matter and a solvent, the solid matter including a mixture of a polyisocyanate, a polyol having ethylene oxide and a hydrophobic polyol; a distance between axes of adjacent nozzles is adjusted to be smaller than 100 mm; and a viscosity of the coating liquid is adjusted within a range from 1 to 3 mPa·s so as not to allow droplet shapes of the coating liquid discharged from the plurality of nozzles to overlap with each other when the coating liquid is discharged from the nozzles, and so as to cause the coating liquid applied on the substrate to be flattened by means of a leveling action of the coating liquid by only the horizontal conveyance of the substrate.

In the process for production of a water-absorbing article according to the second aspect of the present invention, the concentration of the solid matter in the coating liquid may be set within a range from 5 to 30% in mass.

DETAILED DESCRIPTION

The present invention will now be explained in detail by exemplification. The following detailed explanations are common in the first and second aspects of the present invention unless it is specified that such explanation is given for either one of the first and second aspects.

According to the first aspect of the present invention, a coating liquid is supplied from a nozzle disposed above a surface of horizontally-conveyed substrate (preferably, flat-plate-shaped substrate, more preferably, rectangular flat-plate-shaped substrate). Moreover, a concentration of solid matter in this coating liquid is adjusted within a range from 5 to 30% in mass, and a viscosity of this coating liquid is adjusted within a range from 1 to 3 mPa·s, preferably, a range from 1 to 2.5 mPa·s. Therefore, a relatively thick coating film (preferably having a thickness of 5 to 100 μm, more preferably having a thickness of 5 to 60 μm, much more preferably having a thickness of 10 to 50 μm) can be formed on the substrate while achieving a favorable flatness of surface of the coating film.

According to the second aspect of the present invention, a coating liquid is supplied from nozzles disposed above a surface of horizontally-conveyed substrate (preferably, flat-plate-shaped substrate, more preferably, rectangular flat-plate-shaped substrate). A viscosity of this coating liquid is adjusted within a range from 1 to 3 mPa·s, preferably, a range from 1 to 2.5 mPa·s. Moreover, a space between the nozzles is adjusted by making a distance between axes of adjacent nozzles be smaller than 100 mm, so as not to allow droplet shapes of the coating liquid discharged from the nozzles to overlap with each other when the coating liquid is discharged from the nozzles. Therefore, the coating liquid applied on the substrate can be flattened by means of a leveling action of coating liquid by only the horizontal conveyance of substrate.

If the substrate is passed through the nozzle under a state where the nozzle is continuing to discharge the coating liquid, the coating liquid put on an end portion of substrate drops out of the substrate through an edge portion of the substrate. Hence, there is a possibility that a liquid quantity necessary for the end portion of substrate and its surroundings cannot be secured. As a result, there is a possibility that a liquid-shortage defect (a defect which generates a portion on which no coating film is formed) is caused. Also, in such a case, there is a possibility that the coating liquid moves to a reverse side of the substrate around the substrate so that a quality of external appearance of article is reduced. Therefore, it is preferable that the conveyance of substrate is temporarily stopped when a position of nozzle becomes located inwardly from an end of the substrate by 5 mm or more, and then, the supply of coating liquid is started and followed by a restart of the glass conveyance.

In a case of trying to efficiently obtain a thick coating film, it is preferable that the solid matter included in the coating liquid accounts for a rate falling within a range from 10 to 30% in mass. It is more preferable that the solid matter accounts for a rate falling within a range from 15 to 30% of the coating liquid in mass. Contrary to this, if the solid matter accounts for a rate greater than 30% in mass, it is difficult to adjust the viscosity of coating liquid within the range from 1 to 3 mPa·s.

The viscosity of coating liquid mainly contributes to a favorable surface flatness of thick coating film. If the viscosity of coating liquid is greater than 3 mPa·s, the leveling action of coating liquid tends to decrease when the coating liquid is applied to the substrate. As a result, the flatness of surface of coating film tends to be reduced. On the other hand, if the viscosity of coating liquid is lower than 1 mPa·s, the coating liquid put on the substrate tends to move around the substrate to the reverse side of substrate so that the quality of external appearance of article tends to be reduced. Therefore, this level of viscosity is unfavorable.

The above-mentioned viscosity of coating liquid can be adjusted also by a surrounding temperature environment. It is preferable that the surrounding temperature is set within a range from 20 to 30° C., also in order to easily adjust the viscosity of coating liquid within the range from 1 to 3 mPa·s. Moreover, it is more preferable that the surrounding temperature is set within a range from 21 to 27° C., and it is much more preferable that the surrounding temperature is set within a range from 23 to 25° C. In addition, it is preferable that a temperature of the coating liquid and a temperature of the substrate on which the coating liquid is applied are adjusted under a constant condition.

As a method of easily adjusting the viscosity of coating liquid within 1 to 3 mPa·s, it is preferable that the solvent contains a methyl ethyl ketone and a contained amount of methyl ethyl ketone is greater than or equal to 80% in mass in the solvent. Because the methyl ethyl ketone has a low viscosity equal to 0.4 mPa·s (20° C.), it becomes easy to adjust the viscosity of the coating liquid containing much solid content into the range from 1 to 3 mPa·s, by using a solvent composed predominantly of the methyl ethyl ketone. Therefore, such a usage of methyl ethyl ketone is preferable.

A liquid substance has a tendency to volatilize more easily as its viscosity becomes lower. In a case that a highly volatile substance is used as the solvent, a duration time is short for which the solvent is being held on the substrate after the coating liquid is applied to the substrate. Thereby, it becomes difficult to obtain a duration time sufficient to level the applied coating liquid. Moreover, in this case, the concentration of solid matter in the coating liquid tends to vary with time so that a management of the coating liquid tends to be complicated. In a case that a substance is selected for the solvent only in consideration of low volatile property, the viscosity of coating liquid is increased. In this case, the coating liquid is difficult to spread for coat when the coating liquid is applied to the substrate. Thereby, it becomes difficult to obtain the coating film having a flat surface. The methyl ethyl ketone has a relatively high boiling point equal to 80° C. under atmospheric pressure, although the methyl ethyl ketone has a relatively low viscosity. Accordingly, by using the methyl ethyl ketone, the concentration of solid matter in the coating liquid is difficult to vary as compared with the other liquid substances having low viscosity. Moreover, the vaporization of solvent is attained after the coating liquid is applied to the substrate, for example even in the case where a coating environment is at 20~30° C. This vaporization is conducted while securing the duration time sufficient for the leveling of the coating liquid. Therefore, it is preferable that the contained amount of methyl ethyl ketone is greater than or equal to 80% in mass in the solvent, in order to efficiently produce the water-absorbing article.

In the process for production of a water-absorbing article according to the present invention, it is preferable that a moisture amount in the coating liquid existing inside the nozzle is adjusted to be smaller than or equal to 1000 ppm. It is more preferable that this moisture amount is adjusted to be smaller than or equal to 900 ppm, and it is much more preferable that this moisture amount is adjusted to be smaller than or equal to 800 ppm. A lower limit value of the moisture amount is not limited to a certain level according to the present invention, but may be 100 ppm or preferably 200 ppm in consideration of production cost.

This implementation of adjustment of moisture amount is preferable in order to reduce impurities which result from a reaction between polyisocyanate and water included in the coating liquid and which do not resinify, and thereby to obtain a water-absorbing article having a superior quality of external appearance. Moreover, the implementation of adjustment of moisture amount is preferable also from a view point of the fact that a waste of raw materials is reduced by reducing the impurities which do not resinify.

As a method of adjusting the moisture amount of coating liquid, it is preferable that an environment under which the coating liquid is applied to the substrate is adjusted to have a relative humidity falling within a range from 60 to 10% RH. Moreover, it is more preferable that this relative humidity is adjusted in a range from 55 to 30% RH, and it is much more preferable that this relative humidity is adjusted in a range from 50 to 35% RH.

In the process for production of a water-absorbing article according to the present invention, the number of nozzles to be used is set in accordance with an area (dimensions) of the substrate or an area to which the coating liquid should be applied. In view of production efficiency, according to the present invention, it is preferable that the coating liquid is supplied from a plurality of nozzles and the plurality of nozzles are arranged in a direction that perpendicularly crosses the substrate relative to a conveying direction of the substrate.

Further, it is preferable that the supply of coating liquid from the nozzle is stopped or suspended when the substrate does not exist underneath the nozzle.

Furthermore, it is preferable that the coating liquid includes a surfactant, and the surfactant has 0.0001 to 0.007 times the amount of solid matter by mass ratio. It is more preferable that the surfactant has 0.001 to 0.005 times the amount of solid matter by mass ratio. By adding the surfactant, a leveling performance of coating liquid is further improved resulting in a favorable effect. If a contained amount of the surfactant is more than this preferable range, there is a possibility that the quality of coating film obtained is influenced by the surfactant so that an original performance of water-absorbing article becomes difficult to deliver. On the other hand, if the contained amount of surfactant is smaller than the above-mentioned preferable range, the leveling performance of coating liquid is less improved. Thus, it is preferable that the contained amount of surfactant is adjusted into the above-mentioned range, in consideration of the possibility that the quality of coating film obtained is influenced by the surfactant.

The production process of water-absorbing article according to the present invention has an advantageous effect of enhancing the production efficiency, in a production process including a step of applying coating liquid to a substrate.

Figure 1:
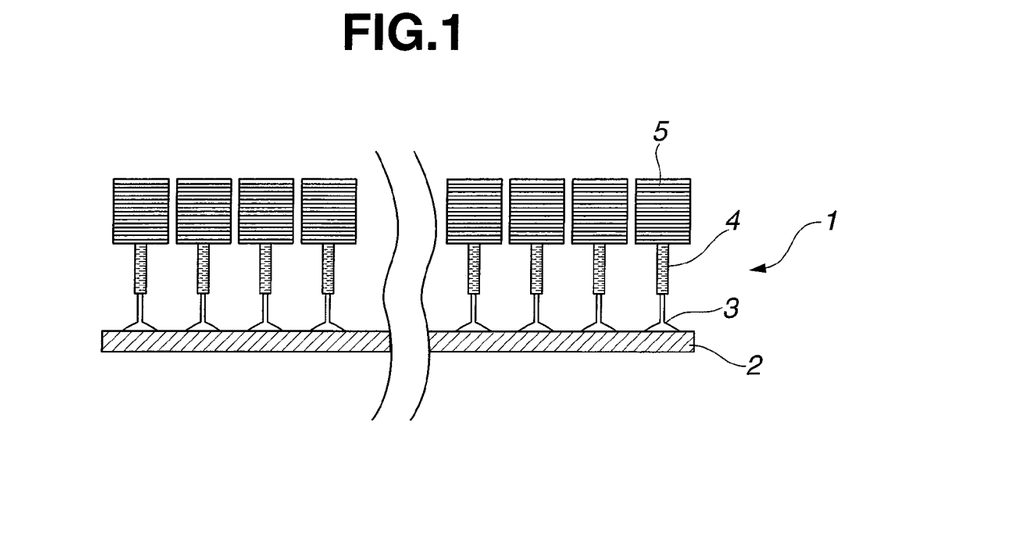
FIG. 1 A view showing a main part of cross section when a coating liquid 3 is being supplied to a substrate 2.
Figure 2:
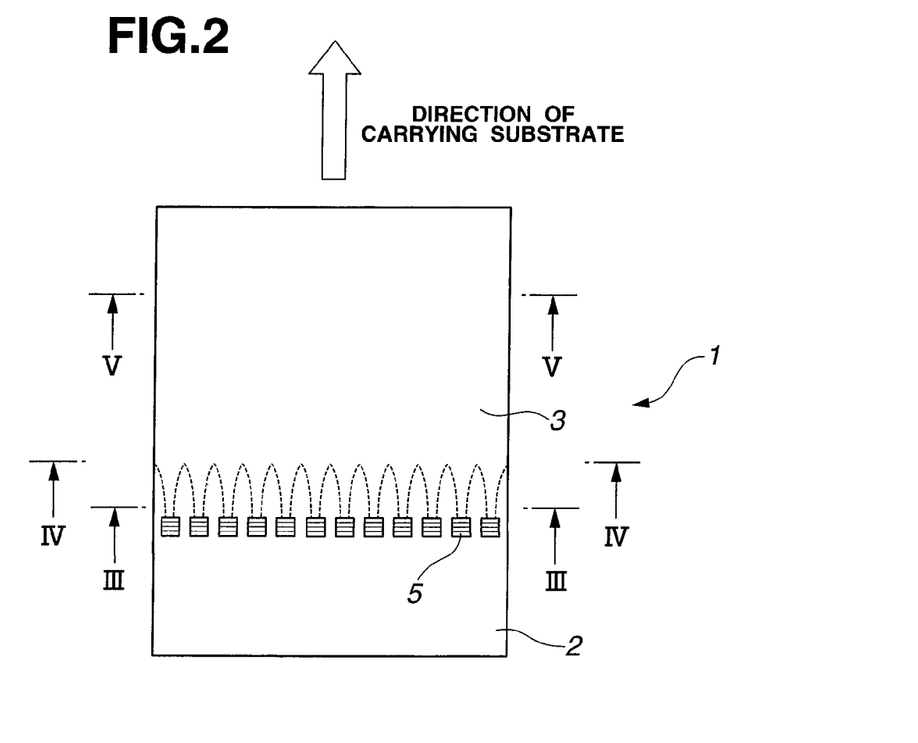
FIG. 2 A view showing a main part when the coating liquid 3 is being supplied to the substrate 2, as viewed from above.
Figure 3:
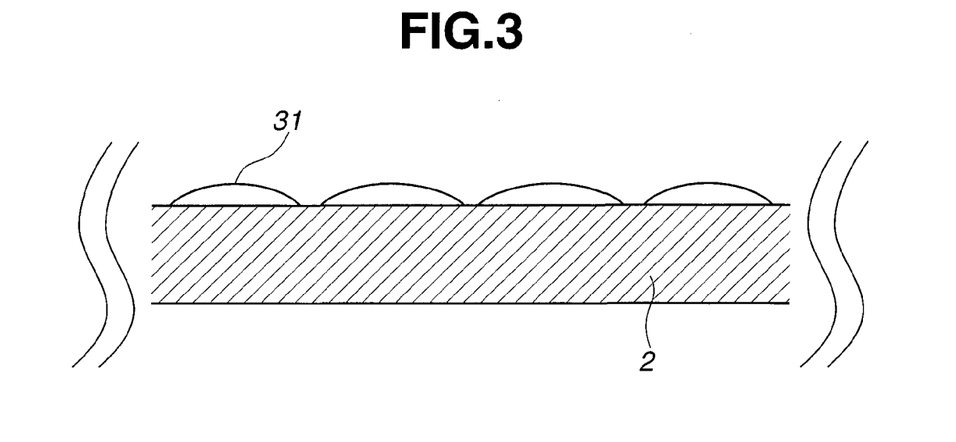
FIG. 3 A cross sectional view taken along a line of FIG. 2.
Figure 4:
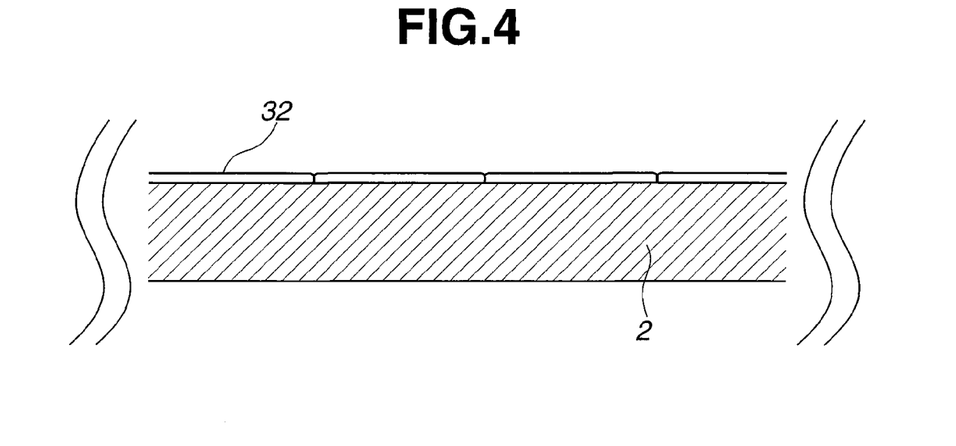
FIG. 4 A cross sectional view taken along a line IV-IV of FIG. 2.
Figure 5:
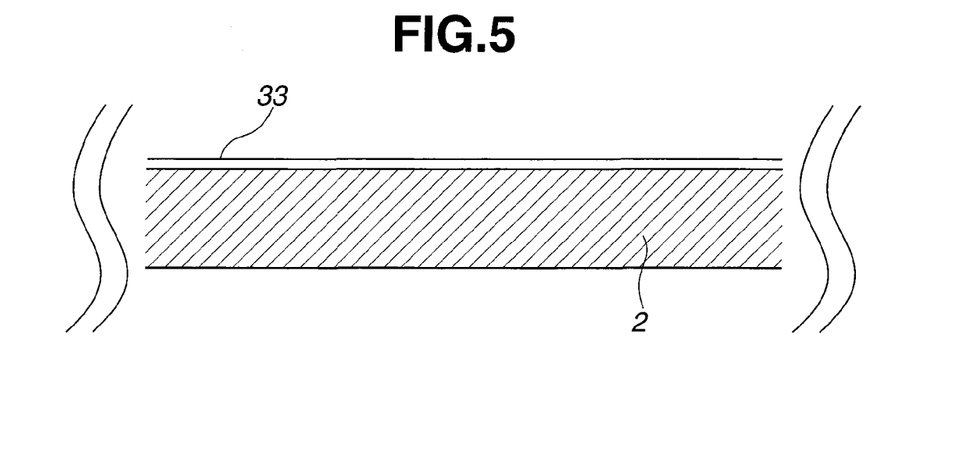
FIG. 5 A cross sectional view taken along a line V-V of FIG. 2.

A preferred embodiment of the production process of water-absorbing article according to the present invention will now be explained referring to the drawings. FIG. 1 is a view showing a main part of cross section when an application liquid (coating liquid) 3 is being supplied to a substrate (base member) 2. Moreover, FIG. 2 is a view showing a main part when the application liquid 3 is being supplied to the substrate 2, as viewed from above. Moreover, FIG. 3 shows a main part of a cross sectional view of FIG. 2, taken along a line of FIG. 2. FIG. 4 shows a main part of a cross sectional view of FIG. 2, taken along a line IV-IV of FIG. 2. FIG. 5 shows a main part of a cross sectional view of FIG. 2, taken along a line V-V of FIG. 2.

The application liquid 3 is, for example, retained by a tank (not shown) capable of pressurizing the application liquid 3. The application liquid 3 is supplied through pipes (not shown) to electromagnetic valves 5. Then, the application liquid 3 is supplied to the substrate 2 from nozzles 4 connected with the electromagnetic valves 5. The substrate 2 is conveyed in a horizontal direction (relative to earth), and the nozzles 4 are disposed approximately perpendicular to the substrate 2. It is preferable that a flow amount of application liquid 3 from one nozzle 4 (i.e., per one nozzle 4) is set at a value ranging from 0.5 to 5 g/second. It is more preferable that this flow amount of application liquid 3 is set at a value ranging from 1 to 3 g/sec., and it is much more preferable that the flow amount of application liquid 3 is set at a value ranging from 1.5 to 2.5 g/sec.

In order to adjust the flow amount of application liquid from the nozzle 4, it is preferable that an opening portion (inner diameter of needle) of front end of the nozzle 4 has a diameter value ranging from 0.5 to 3 mm, and it is more preferable that this opening portion has a diameter value ranging from 0.8 to 2.5 mm. If this inner diameter of nozzle 4 is smaller than 0.5 mm, the flow amount is too small so that it is difficult to obtain a target value of flow amount. On the other hand, if this inner diameter of nozzle 4 is larger than 3 mm; the flow amount tends to become excessively large, or a liquid-stopping performance (shutoff speed of liquid) tends to be worsened when the supply of application liquid is stopped, because the viscosity of application liquid which is used in this embodiment ranges from 1 to 3 mPa·s, i.e., is relatively low.

Moreover, it is preferable that a distance between the substrate 2 and the front end of nozzle 4 is equal to a value ranging from 5 to 150 mm. It is more preferable that this distance between the substrate 2 and the front end of nozzle 4 is equal to a value ranging from 10 to 60 mm. If this distance is smaller than 5 mm, there is a risk that the substrate makes contact with the nozzle to reduce the quality of coating film when the substrate is conveyed by a conveyance mechanism (carrying mechanism). If this distance is greater than 150 mm, a splash of application liquid tends to occur when the application liquid is made to flow on the substrate. In this embodiment, a generally-available nozzle and electromagnetic valve can be used as the nozzle 4 and the electromagnetic valve 5. Particularly, a general-purpose nozzle formed of SUS304, SUS316 or the like can be used as the nozzle 4.

It is preferable that a distance between adjacent two nozzles 4 is constant, i.e., the nozzles 4 are arranged at equal intervals. In detail, it is preferable that a distance between axes of adjacent nozzles 4 is equal to a value ranging from 5 to 100 mm, and it is more preferable that the distance between axes of adjacent nozzles 4 is equal to a value ranging from 10 to 60 mm. It is much more preferable that the distance between axes of adjacent nozzles 4 is equal to a value ranging from 15 to 35 mm.

Two nozzles located at both ends of the plurality of nozzles arranged as mentioned above may be disposed to face in an inner direction of the substrate. That is, by inclining the both-side nozzles toward an inner side of substrate, the flows of application liquid from the both nozzles are directed inwardly when the both nozzles discharge the application liquid. This case is preferable since the application liquid becomes difficult to spill and drop outwardly from both ends of the substrate.

The application liquid 3 applied to the substrate 2 which is being conveyed in the horizontal direction is attached to the substrate 2 in a droplet shape, for some time after being supplied from the nozzle 4. Thereby, the application liquid 3 forms droplet-shaped application liquids 31 as shown in FIG. 3. Then, each droplet-shaped application liquid 31 is gradually flattened by its leveling action (see, droplet-shaped application liquids 32 flattened by means of leveling action in FIG. 4). According to the present invention, the application liquid 3 is discharged so as not to allow the droplet-shaped application liquids to overlap with each other initially. Hence, the discharged application liquid can become in contact with the adjacent discharged application liquid under a state where both of these discharged application liquids have already been flattened to some extent. Then, finally, the discharged application liquids are integrated with one another so that a surface of the integrated application liquid is flattened as shown in FIG. 5 (see, application liquid 33 whose surface has been flattened by means of the leveling action).

The application liquid 3 applied to the substrate 2 which is conveyed in the horizontal direction is placed on the substrate 2 in a shape of lines as shown in FIG. 2, for some time after being supplied from the nozzles 4. Then, the application liquid placed in the shape of lines becomes in a planar state by the leveling action of application liquid. The substrate 2 is conveyed by the conveyance mechanism (not shown). As this conveyance mechanism, a general-purpose roller conveyor, belt conveyor or the like may be used in this embodiment. It is preferable that a conveyance speed of the substrate 2 is set at a value ranging from 0.2 to 1.4 m/s. It is more preferable that the conveyance speed of substrate 2 is set at a value ranging from 0.2 to 0.8 m/s. If the conveyance speed is lower than 0.2 m/s, a production tact time (cycle time) tends to become long to cause a high production cost. If the conveyance speed is higher than 1.4 m/s, there is a risk that the quality of coating film is adversely affected due to an air inclusion (entrainment) near the applied coating portion (for example, a film unevenness is caused to impair a flatness of the coating film).

In order to regulate the flow amount of application liquid from each nozzle 4, it is preferable that a discharge pressure of application liquid 3 from the nozzle 4 at the time of supply of application liquid is adjusted within a range from 0.005 to 0.3 MPa. It is more preferable that this discharge pressure is adjusted within a range from 0.01 to 0.2 Mpa, and it is much more preferable that this discharge pressure is adjusted within a range from 0.02 to 0.1 Mpa.

As one preferable case, the substrate (base member) 2 is a glass substrate. For example, a substrate formed of a soda-lime silicate glass, an alkali-free glass or a borosilicate glass can be used as the substrate 2 in this embodiment. Particularly, it is preferable that a plate glass which is normally used for an automotive glass, an architectural glass, an industrial glass or the like and which is manufactured by a float method, a duplex method, a roll-out method or the like is used as the substrate 2 in this embodiment. As a glass type in this embodiment, it is possible to use various color glasses such as a clear glass, a green glass and a bronze glass; various functional glasses such as a UV shielding glass and an IR shielding glass and an electromagnetic shielding glass; glasses usable for fire-retarding glasses such as a wired glass, a low-expansion glass and a zero-expansion glass; a chemically tempered glass; a thermally tempered glass (produced by air quenching); a laminated glass; and the like.

In the case that the substrate 2 is a glass, a primer layer may be formed on a surface of the substrate 2, by using a silane coupling agent. Aminosilane, mercaptosilane or epoxysilane can be cited as a preferable silane coupling agent. Particularly, it is preferable that γ-glycidoxypropyltrimethoxysilane, γ-aminopropyltriethoxysilane or the like is used as the silane coupling agent.

The substrate 2 in this embodiment may be a plastic substrate formed of acrylic, polycarbonate or the like, as an example other than the glass substrate. Although a plate thickness of the substrate 2 is not particularly limited, it is preferable that the plate thickness ranges from 0.1 mm to 10 mm. It is more preferable that that the plate thickness ranges from 0.2 mm to 5.0 mm.

It is preferable that the above-mentioned coating film formed of urethane resin having water-absorbing property is a coating film including an urethane resin that contains polyoxyalkylene-chain. This is because the urethane resin has wear and abrasion resistance superior to the other resins by virtue of elasticity inherent in the urethane resin. From a view point of cost efficiency, it is preferable that the coating film is formed by only the resin.

Moreover, in order to suppress the fogging of article and in order to ensure the transparency of article, it is preferable that the thickness of coating film is set at a relatively large value ranging from 5 to 100 µm when the water absorption rate of coating film is set at a value ranging from 20 to 40% in mass.

The urethane resin can be obtained by causing a polyisocyanate to react with a polyol. By appropriately selecting the polyol, a function of coating film can be set. The coating film can be obtained by applying the application liquid containing the polyisocyanate, the polyol and the other chemical species and/or their reaction products, on the substrate; and by curing the applied liquid.

As the polyisocyanate, it is possible to use a diisocyanate, preferably a trifunctional polyisocyanate having a biuret and/or isocyanurate structure using hexamethylenediisocyanate as its starting material. This material has weather resistance, chemical resistance and thermal resistance, and is effective particularly for weather resistance. Besides this material, it is possible to use diisophoronediisocyanate, diphenylmethanediisocyanate, bis(methylcyclohexyl)diisocyanate, tolylenediisocyanate, etc.

It is preferable that the number of isocyanate groups existing in the polyisocyanate is adjusted to an amount of one time to three times the number of hydroxyl groups existing in the polyol component, more preferably 1.2 times to 2.5 times that. If the number of isocyanate groups existing in the polyisocyanate is less than one time that of hydroxyl groups, a curing property of the application liquid becomes worse, and furthermore, the formed film is soft and lowers its durability such as weather resistance, solvent resistance and chemical resistance. On the other hand, if the number of isocyanate groups existing in the polyisocyanate exceeds three times that of hydroxyl groups, the manufacturing of the coating film tends to become difficult by an excessive curing.

The water-absorbing polyol such as a polyoxyalkylene-series polyol which is used as the polyol for forming the urethane resin containing polyoxyalkylene-chain can produce an urethane bond because the hydroxyl group in its molecule reacts with the isocyanate group of isocyanate prepolymer. Therefore, it is possible to introduce the water absorbing property into the urethane resin.

A usage amount of the water-absorbing polyol is adjusted to cause the water absorption percentage of coating film to preferably become 10% or greater in mass at the time of saturation of water absorption. Thereby, an amount of water-absorbing component derived from the water absorbing polyol is suitably adjusted in the coating film. As this water absorbing component, it is possible to use one derived from the oxyalkylene-series polyol. It is preferable that the water absorbing component has an oxyethylene chain, oxypropylene chain, or the like. It is particularly preferable that the water absorbing component is a polyethyleneglycol containing the oxyethylene chain superior in water absorbing property.

In the case that the polyethyleneglycol is used, it is preferable that a number-average molecular weight of polyethyleneglycol is set at a value ranging from 400 to 2000 in consideration of the water-absorbing property and a strength of obtainable coating film.

A hydrophobic polyol can improve a water resistance and an abrasion resistance of the coating film. Moreover, the hydrophobic polyol secures a reticulated structure inside the coating film, so that a water flow path is reliably secured when the water is discharged from the oxyethylene chain which has absorbed the water. Thereby, the water absorption to the coating film and a water removal from the coating film can be conducted smoothly. It is preferable that the hydrophobic polyol is acrylicpolyol, polycarbonatepolyol or polycaprolactonepolyol.

In the case of acrylicpolyol, the acrylicpolyol has both of flexibility and abrasion resistance and hardly reduces the water-absorbing function of coating film. As a result, the water resistance and the abrasion resistance of coating film can be enhanced. In addition to this, in the case of acrylicpolyol, it is easy to shorten a leveling step of uniformizing deviations of film thickness, when the application liquid for forming the coating film is applied to the substrate. Accordingly, in order to obtain a flat surface of the coating film, it is preferable that the acrylicpolyol is used.

A ratio between the polyoxyalkylene-series polyol and the hydrophobic polyol is adjusted to cause the water absorption percentage of coating film to become equal to a value ranging from 10 to 40% in mass. For example, in the case of combination of polyethyleneglycol and acrylicpolyol, it is preferable that the mass ratio between polyethyleneglycol and acrylicpolyol is set at a ratio value ranging from 50:50 to 70:30, i.e., "Polyethyleneglycol:Acrylicpolyol=50:50~70:30".

A hydrophobic component derived from the hydrophobic polyol is introduced so that the water absorption percentage of coating film falls within the above-mentioned range. Preferably, this hydrophobic component is introduced so that a pencil hardness of the coating film which is obtained based on "JIS K 5600 (year 1999)" falls within a range from "HB" to "F" at the time of saturation of water absorption of coating film. This is because a cleaning or the like of the coating film becomes difficult due to an occurrence of film scratch (abrasion) or the like if the hardness of coating film is low.

Moreover, in consideration of workability of a wiping operation such as the cleaning, a straight-chain polydimethylsiloxane having a functional group capable of reacting with the isocyanate group at both-side terminal portions thereof can be introduced into the coating film. The straight-chain polydimethylsiloxane which is preferably introduced into the coating film can be introduced as a cross-linking unit in the resin forming the coating film.

As the functional group capable of reacting with the isocyanate group, it is possible to use functional groups each having an active hydrogen bonded to oxygen, nitrogen or sulfur which is large in electronegativity, such as a hydroxy group, a carboxyl group, an amino group, an imino group, a mercapto group, a sulfino group and a sulfo group. Of these, in view of a handling easiness, a pot life as the coating liquid and a durability of obtainable coating film, it is preferable that the hydroxy group is used as the functional group that can react with the isocyanate group.

Moreover, as a surfactant which is introduced in order to improve the leveling performance of application liquid (coating liquid), it is preferable that a silicone-series surfactant, an acrylic-series surfactant or the like is used.

The water absorption percentage of coating film which has been explained above according to the present invention is defined as a value measured by the following method. [At first, a mass (a) of an article having the coating film is measured, when the article has just been held for twelve hours under a state where a relative humidity is equal to 50% RH and a temperature is equal to 25° C. after the article was held for twelve hours under a state where the relative humidity is equal to 50% RH and the temperature is equal to 55° C. Next, the coating film of article is brought into contact with a saturated water vapor having a temperature of 43° C., for five minutes. Soon afterward, a water film formed on the surface of coating film is wiped, and then a mass (b) of the article is measured. A value obtained by a calculation formula of: [b–a]/[a–(Mass of glass plate)]×100(%) is regarded as the water absorption percentage at the time of saturation of water absorption. That is, the water absorption percentage represents a water amount which can be absorbed relative to a mass of the coating film, by mass percentage. The value of (a) corresponds to a state where the coating film has not yet absorbed water.]

First Example

1. Preparation of Application Apparatus

An application apparatus 1 whose main part has a structure as shown in FIGS. 1 and 2 was prepared. A needle of nozzle 4 has an inner diameter equal to 1.4 mm, and each distance between adjacent axes of nozzles 4 (formed of SUS316) was set at a constant value equal to 25 mm. (That is, the nozzles 4 are arranged at intervals of 25 mm.) The number of disposed nozzles 4 is thirty nine. Moreover, a position of each nozzle 4 was adjusted to cause the distance between the nozzle 4 and an upper surface of glass to become equal to 25 mm when the substrate 2 having a thickness of 3 mm was located below the nozzle 4. Moreover, a surrounding environment of the application apparatus 1 was adjusted to a state where the temperature is equal to 25° C. and the relative humidity is equal to 45% RH.

2. Preparation of Application Liquid 3

As the isocyanate having isocyanate group, a biuret-type polyisocyanate of hexamethylenediisocyanate (trade name: "N3200" made by Sumika Bayer Urethane Co., Ltd.) was used as a coating agent A.

Polyethylene glycol having an average molecular weight of 1000, and a solution ("Desmophene A450BA" made by Sumika Bayer Urethane Co., Ltd.) containing an acrylicpolyol accounting for 50 mass % and having an average molecular weight of 3000 and a hydroxyl value of 33 mgKOH/g were prepared. These two were mixed together at a mass ratio of 60:40 between the polyethylene glycol and the acrylic polyol, i.e., Polyethyleneglycol:Acrylicpolyol=60:40. This mixed one was used as a coating agent B.

In order to cause the number of isocyanate groups existing in isocyanate component of the coating agent A to become 1.8 times the number of hydroxy groups existing in polyol component in the coating agent B, the coating agent A of 33 g in mass was added and mixed relative to the coating agent B of 100 g in mass. In order to cause the concentration of solid matter (solid content) to become equal to 27% in mass, methyl ethyl ketone as a diluting solvent was added to and mixed with the mixture of coating agent A and coating agent B. Next, a surfactant (SILWET L-7001, made by Momentive Performance Materials Japan LLC.) was added to this mixture to cause the surfactant to become 0.002 times the amount of solid matter. Thus, the application liquid for forming the coating film was prepared.

The solvent of application liquid 3 obtained as mentioned above is formed of the methyl ethyl ketone and normal butyl acetate (n-butyl acetate). Specifically, the methyl ethyl ketone accounts for 94 mass % of the solvent of application liquid 3, and the n-butyl acetate accounts for 6 mass % of the solvent of application liquid 3. Moreover, a viscosity of this application liquid was equal to 2.0 mPa·s under the temperature of 25° C.

3. Preparation of Substrate 2

A solution was prepared by a denatured alcohol (EKINEN F-1, made by Japan Alcohol Trading CO., LTD.) formed of 90 wt % ethanol and 10 wt % isopropyl alcohol to cause γ-aminopropyltriethoxysilane (LS-3150, made by Shin-Etsu Silicones) to account for 1% by weight ratio. Then, this solution was applied by wiping a surface of a rectangular glass plate of 1000 mm×1000 mm×3 mm (thickness) which was formed of a soda-lime-silicate glass obtained by float method, with a wiper (trade name: BEMCOT, type: M-1, 50 mm×50 mm, made by OZU CORPORATION) made of cellulose fibers that had absorbed this solution. After drying the glass plate under room temperature condition, its film surface was washed with a wiper by using tap water. Thus, the substrate 2 was prepared.

4. Application of Coating Liquid 3 to Substrate 3 and Formation of Coating Film

The substrate 2 is inputted and moved from an upstream side beyond a location at which the nozzles 4 are arranged, by a conveyance unit (not shown in FIGS. 1 and 2). Then, when this substrate 2 has moved about 500 mm in a downward side, the other substrate 2 is inputted. In this first example, ten pieces of substrates 2 were inputted in total. Each substrate 2 is conveyed in the horizontal direction at a speed of 0.4 m/s, and is passed through the location underneath the nozzle 4. When the substrate 2 has just moved 10 mm in the downstream direction (in a moving direction of the substrate 2) after a downstream-side edge of substrate 2 reached the location underneath the opening portion (needle) of nozzle 4, a supply of the coating liquid 3 is started by adjusting the discharge pressure within a range from 0.025 to 0.05 MPa to achieve the flow amount of 2.2 g/sec. Then, the supply of coating liquid 3 is finished, when a portion of substrate 2 which is located 10 mm downwardly from an upstream-side edge of the substrate 2 has just reached the location underneath the opening portion (needle) of nozzle 4. By the repetition of this, the coating liquid 3 was applied to all the inputted (conveyed) substrates 2. The supply of coating liquid 3 from each nozzle 4 is conducted by opening and closing operations of the electromagnetic valve 5. When the electromagnetic valve 5 is open, the coating liquid 3 is supplied onto the substrate 2.

The substrate 2 was conveyed further in the downward direction, and was heated at 120° C. for 60 minutes, so that ten pieces of water-absorbing articles were obtained. Each water-absorbing article obtained in this first example did not fog even if a breath (exhaled air) was blown on the water-absorbing article. Moreover, an external appearance of each article had no abnormality, and a thickness of the coating film in a film-formation surface of each article was equal to 50±3 μm.

Second Example

Ten pieces of water-absorbing articles were obtained in the same manner as the first example, except that an addition amount of the diluting solvent was adjusted to cause the concentration of solid matter to become equal to 24% in mass. In this second example, the methyl ethyl ketone accounts for 94 mass % of the solvent of coating liquid, and the n-butyl acetate accounts for 6 mass % of the solvent of coating liquid. Moreover, a viscosity of this coating liquid was equal to 1.8 mPa·s under the temperature of 25° C. Each water-absorbing article obtained in this second example did not fog even if a breath was blown on the water-absorbing article. Moreover, an external appearance of each article had no abnormality, and a thickness of the coating film in a film-formation surface of each article was equal to 42±3

Third Example

Ten pieces of water-absorbing articles were obtained in the same manner as the first example, except that the addition amount of diluting solvent was adjusted to cause the concentration of solid matter to become equal to 20% in mass. In this third example, the methyl ethyl ketone accounts for 94 mass % of the solvent of coating liquid, and the n-butyl acetate accounts for 6 mass % of the solvent of coating liquid. Moreover, a viscosity of this coating liquid was equal to 1.3 mPa·s under the temperature of 25° C. Each water-absorbing article obtained in this third example did not fog even if a breath was blown on this water-absorbing article. Moreover, an external appearance of each article had no abnormality, and a thickness of the coating film was equal to 35±3 μm.

Fourth Example

Ten pieces of water-absorbing articles were obtained in the same manner as the first example, except that the addition amount of diluting solvent was adjusted to cause the concentration of solid matter to become equal to 16 in mass. In this fourth example, the methyl ethyl ketone accounts for 83 mass % of the solvent of coating liquid, and the n-butyl acetate accounts for 17 mass % of the solvent of coating liquid. Moreover, a viscosity of this coating liquid was equal to 1.3 mPa·s under the temperature of 25° C. Each water-absorbing article obtained in this fourth example did not fog even if a breath was blown on this water-absorbing article. Moreover, an external appearance of each article had no abnormality, and a thickness of the coating film was equal to 23±3 μm.

First Comparative Example

Ten pieces of water-absorbing articles were obtained in the same manner as the first example, except that an acetone is used as the diluting solvent instead of the methyl ethyl ketone. In this comparative example, the acetone accounts for 94 mass % of the solvent of coating liquid, and the n-butyl acetate accounts for 6 mass % of the solvent of coating liquid. Moreover, a viscosity of this coating liquid was equal to 1.7 mPa·s under the temperature of 25° C. In each water-absorbing article obtained in this comparative example, the flattening of coating film was insufficient. This is because a vaporization of solvent occurred before attaining the leveling of coating liquid 3 applied to the substrate 2, resulting in a shortage of the leveling.

Second Comparative Example

Ten pieces of water-absorbing articles were obtained in the same manner as the first example, except that the addition amount of diluting solvent was adjusted to cause the concentration of solid matter to become equal to 2% in mass. In this comparative example, the methyl ethyl ketone accounts for 94 mass % of the solvent of coating liquid, and the n-butyl acetate accounts for 6 mass % of the solvent of coating liquid. Moreover, a viscosity of this coating liquid was equal to 0.6 mPa·s under the temperature of 25° C. The coating film of each water-absorbing article obtained in this comparative example had a film thickness of 4±1 μm which is relatively thin. Thereby, a target water-absorption amount could not be achieved. Moreover, the coating liquid 3 moved to a surface opposite to the application surface of coating liquid 3, around the substrate 2.

Third Comparative Example

Ten pieces of water-absorbing articles were obtained in the same manner as the first example, except that an isobutyl acetate is used as the diluting solvent instead of the methyl ethyl ketone. In this comparative example, the isobutyl acetate accounts for 94 mass % of the solvent of coating liquid, and the n-butyl acetate accounts for 6 mass % of the solvent of coating liquid. Moreover, a viscosity of this coating liquid was equal to 4.0 mPa·s under the temperature of 25° C. In each water-absorbing article obtained in this comparative example, the leveling of coating liquid 3 applied to the substrate 2 was insufficient, so that a plurality of linear coating films were formed.

Fourth Comparative Example

Ten pieces of water-absorbing articles were obtained in the same manner as the first example, except that the addition amount of diluting solvent was adjusted to cause the concentration of solid matter to become equal to 35% in mass. In this comparative example, the methyl ethyl ketone accounts for 94 mass % of the solvent of coating liquid, and the n-butyl acetate accounts for 6 mass % of the solvent of coating liquid. Moreover, a viscosity of this coating liquid was equal to 3.8 mPa·s under the temperature of 25° C. In each water-absorbing article obtained in this comparative example, the leveling of coating liquid 3 applied to the substrate 2 was insufficient, so that a plurality of linear coating films were formed.

The invention claimed is:

1. A process for production of a water-absorbing article including a substantially flat, plate-shaped substrate and a coating film formed on the substrate, the coating film being formed of a water-absorbing urethane resin,
   the process comprising an application step of applying a coating liquid to the substrate, the application step including a step of supplying the coating liquid from a nozzle to a surface of the substrate, the nozzle being disposed above the substrate conveyed horizontally, wherein
   the coating liquid includes a solid matter and a solvent, the solid matter including a mixture of a polyisocyanate, a polyol having ethylene oxide and a hydrophobic polyol;
   the solvent includes a methyl ethyl ketone accounting for 80% or more of the solvent in mass;
   a concentration of the solid matter in the coating liquid is adjusted within a range from 5 to 30% in mass; and
   a viscosity of the coating liquid is adjusted within a range from 1 to 3 mPa·s.

2. The process according to claim 1, wherein
   a moisture amount of the coating liquid existing inside the nozzle is adjusted to be smaller than or equal to 1000 ppm.

3. The process according to claim 1, wherein
   the coating liquid is supplied from a plurality of nozzles, and
   the plurality of nozzles are arranged in a direction that perpendicularly crosses the substrate relative to a conveying direction of the substrate.

4. The process according to claim 3, wherein
   a distance between axes of adjacent nozzles is adjusted within a range smaller than 100 mm so as not to allow droplet shapes of the coating liquid discharged from the nozzles to overlap with each other when the coating liquid is discharged from the nozzles.

5. The process according to claim 1, wherein
   the supply of the coating liquid from the nozzle is stopped when the substrate does not exist underneath the nozzle.

6. The process according to claim 1, wherein
   the coating liquid includes a surfactant, and
   the surfactant has 0.0001 to 0.007 times the amount of the solid matter.

7. A process for production of a water-absorbing article including a substantially flat, plate-shaped substrate and a coating film formed on the substrate, the coating film being formed of a water-absorbing urethane resin,
   the process comprising an application step of applying a coating liquid to the substrate, the application step including a step of supplying the coating liquid from a plurality of nozzles to a surface of the substrate, the plurality of nozzles being disposed above the substrate conveyed horizontally and being arranged in a direction that perpendicularly crosses the substrate relative to a conveying direction of the substrate, wherein
   the coating liquid includes a solid matter and a solvent, the solid matter including a mixture of a polyisocyanate, a polyol having ethylene oxide and a hydrophobic polyol;
   the solvent includes a methyl ethyl ketone accounting for 80% or more of the solvent in mass;

a distance between axes of adjacent nozzles is adjusted to be smaller than 100 mm; and a viscosity of the coating liquid is adjusted within a range from 1 to 3 mPa·s so as not to allow droplet shapes of the coating liquid discharged from the plurality of nozzles to overlap with each other when the coating liquid is discharged from the nozzles, and so as to cause the coating liquid applied on the substrate to be flattened by means of a leveling action of the coating liquid by only the horizontal conveyance of the substrate.

8. The process according to claim 7, wherein a concentration of the solid matter in the coating liquid is within a range from 5 to 30% in mass.

* * * * *